United States Patent [19]
Siegenthaler

[11] Patent Number: 5,512,115
[45] Date of Patent: Apr. 30, 1996

[54] VECTORIAL ASSEMBLY METHOD FOR FIRST AND SECOND STAGE ASSEMBLIES OF ROAD VEHICLE TIRES

[75] Inventor: Karl J. Siegenthaler, Rome, Italy

[73] Assignee: Bridgestone Corporation, Tokyo, Japan

[21] Appl. No.: 343,384

[22] Filed: Nov. 22, 1994

[30] Foreign Application Priority Data

Dec. 21, 1993 [IT] Italy ................................. T093A0981

[51] Int. Cl.⁶ .............................................. B29D 30/30
[52] U.S. Cl. ........................ 156/75; 156/126; 156/128.6; 156/406.2
[58] Field of Search ............................. 156/75, 126, 127, 156/128.1, 128.6, 129, 406.2, 64; 152/154.1; 73/66, 460

[56] References Cited

U.S. PATENT DOCUMENTS

| | | | |
|---|---|---|---|
| 2,952,900 | 9/1960 | Glavan | 29/453 |
| 3,944,458 | 3/1976 | Branick | 156/130 |
| 4,285,240 | 8/1981 | Gold | 73/462 |
| 4,302,966 | 12/1981 | Ohnishi et al. | 73/66 |
| 4,738,738 | 4/1988 | Holroyd et al. | 156/127 |
| 5,290,376 | 3/1994 | Siegnethaler | 156/130 |

FOREIGN PATENT DOCUMENTS

| | | | |
|---|---|---|---|
| 117637 | 9/1981 | Japan | 156/75 |
| 131405 | 10/1981 | Japan | 156/75 |
| 2208373 | 3/1989 | United Kingdom | 152/154.1 |

Primary Examiner—Geoffrey L. Knable
Attorney, Agent, or Firm—Carmen Santa Maria

[57] ABSTRACT

A vectorial assembly method for first and second stage assemblies (5, 3) of radial tires, whereby a first stage assembly (5), mounted on a rotary inner support (52) so as to rotate about its axis, and a second stage assembly (3), housed inside a toroidal body (7) mounted for rotation, about a horizontal axis (8), on a supporting saddle (31) adjustable about a vertical axis (21), are rotated for determining their respective unbalance vectors, and are assembled, the first (5) inside the second (3), in relative angular positions such as to minimize the unbalance vector of the assembled tire.

5 Claims, 3 Drawing Sheets

VECTORIAL ASSEMBLY METHOD FOR FIRST AND SECOND STAGE ASSEMBLIES OF ROAD VEHICLE TIRES

BACKGROUND OF THE INVENTION

1. Technical Field

The present invention relates to a vectorial assembly method for first and second stage assemblies of road vehicle tires.

In particular, the present invention relates to a vectorial assembly method for first and second stage assemblies of road vehicle tires, comprising phases consisting in placing the first stage assembly about a support rotating about a first axis; placing the second stage assembly inside a toroidal body rotating about a second axis coaxial with the second stage assembly; and mating the two assemblies by inserting the first inside the second.

2. Background Information

According to European Patent Application publication no. 0540048 filed by the present Applicant, a radial tire is produced by forming the second stage assembly of the tire on the inner surface of a toroidal body; separately forming the first stage assembly of the tire; and assembling the first stage assembly inside the toroidal body and on the inner surface of the second stage assembly.

Despite the above known method being devised for the express purpose of immediately imparting a toroidal shape to the component parts of the tire inside the forming mold, as opposed to subsequent shaping which inevitably results in a lack of symmetry, it is obviously impossible to produce first and second stage assemblies, and hence tires, that are perfectly balanced.

SUMMARY OF THE INVENTION

It is an object of the present invention to perfect the above known assembly method, with a view to minimizing unbalance of the finished tires produced thereby.

According to the present invention, there is provided a vectorial assembly method for first and second stage assemblies of road vehicle tires, the method comprising phases consisting in placing the first stage assembly about a first support rotating about a first axis; placing the second stage assembly inside a second support comprising a toroidal body rotating about a second axis coaxial with the second stage assembly; and mating the two assemblies by inserting the first inside the second; characterized by the fact that it comprises further phases consisting in rotating the first and second stage assemblies about their respective axes, for detecting the respective unbalance vectors; the first stage assembly being inserted inside the second stage assembly after arranging the two assemblies in such relative angular positions as to minimize the resultant unbalance vector of the assembled tire.

BRIEF DESCRIPTION OF THE DRAWINGS

A non-limiting embodiment of the present invention will be described by way of example with reference to the accompanying drawings, in which.

DESCRIPTION OF THE PREFERRED EMBODIMENT

Figure 1:
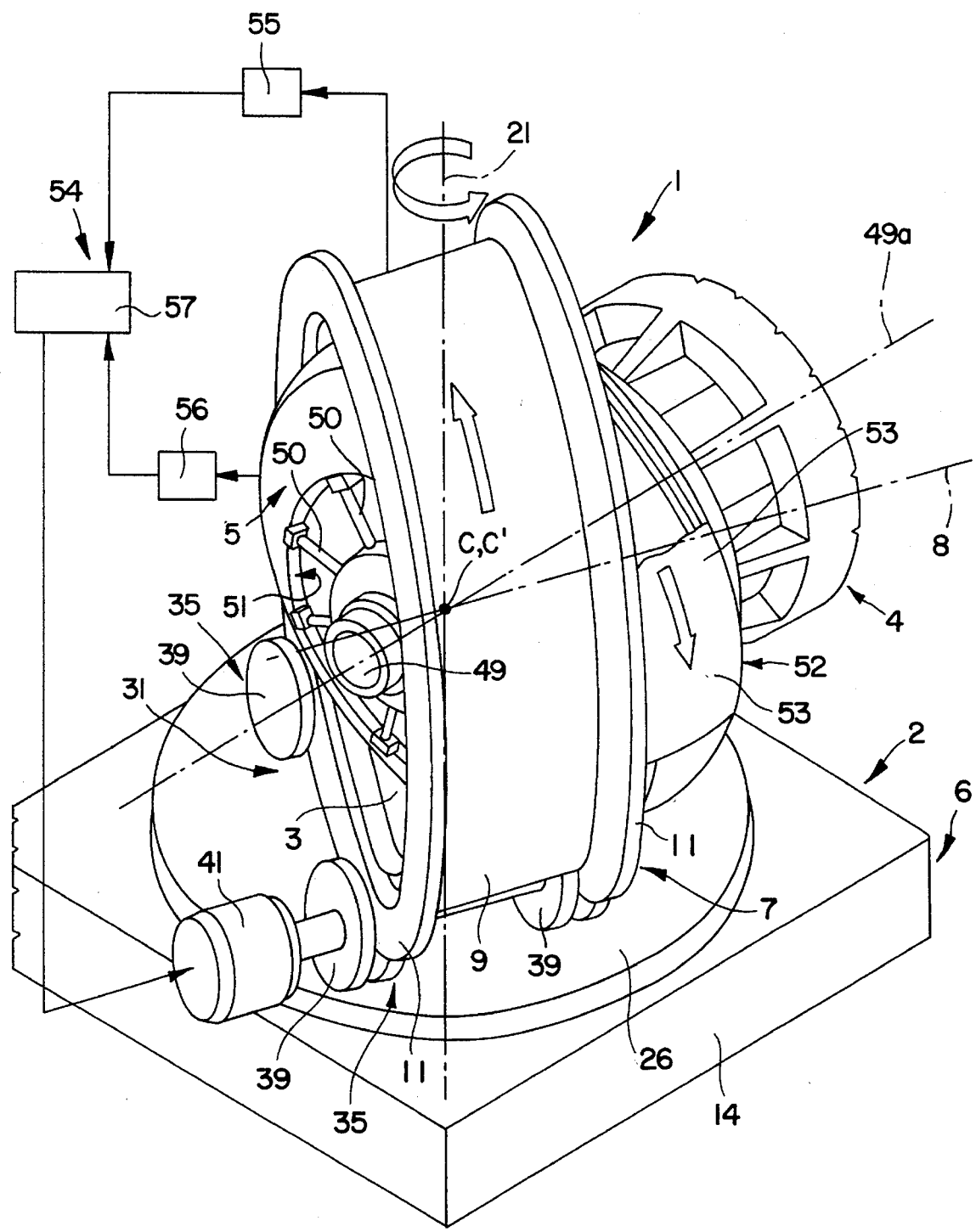
FIG. 1 shows a schematic view in perspective, partly in block form and with parts removed for clarity, of a radial tire assembly station implementing the method according to the present invention.

Number 1 in FIG. 1 indicates an assembly station for a radial tire (not shown), defined by a device 2 for forming and transferring a second stage assembly, i.e., tread assembly 3; and by a device 4 for forming a first stage assembly, i.e., radial carcass 5.

Device 2 comprises a carriage 6 and a toroidal body 7 supported on carriage 6 with its axis 8 arranged substantially horizontally, and in turn comprising an intermediate annular body 9 for housing assembly 3. Annular body 9 is externally cylindrical, and is defined internally by an annular surface 10 having a curved inwardly concave section and designed to contact the outer surface of assembly 3. Toroidal body 7 also comprises two outer annular flanges 11 extending radially outwards from the opposite axial ends of annular body 9.

In addition to carriage 6 and toroidal body 7, device 2 also comprises a fixed frame 12, and two parallel rails 13 supported in a fixed position on frame 12, and in turn supporting carriage 6 in a sliding manner.

Figure 2:
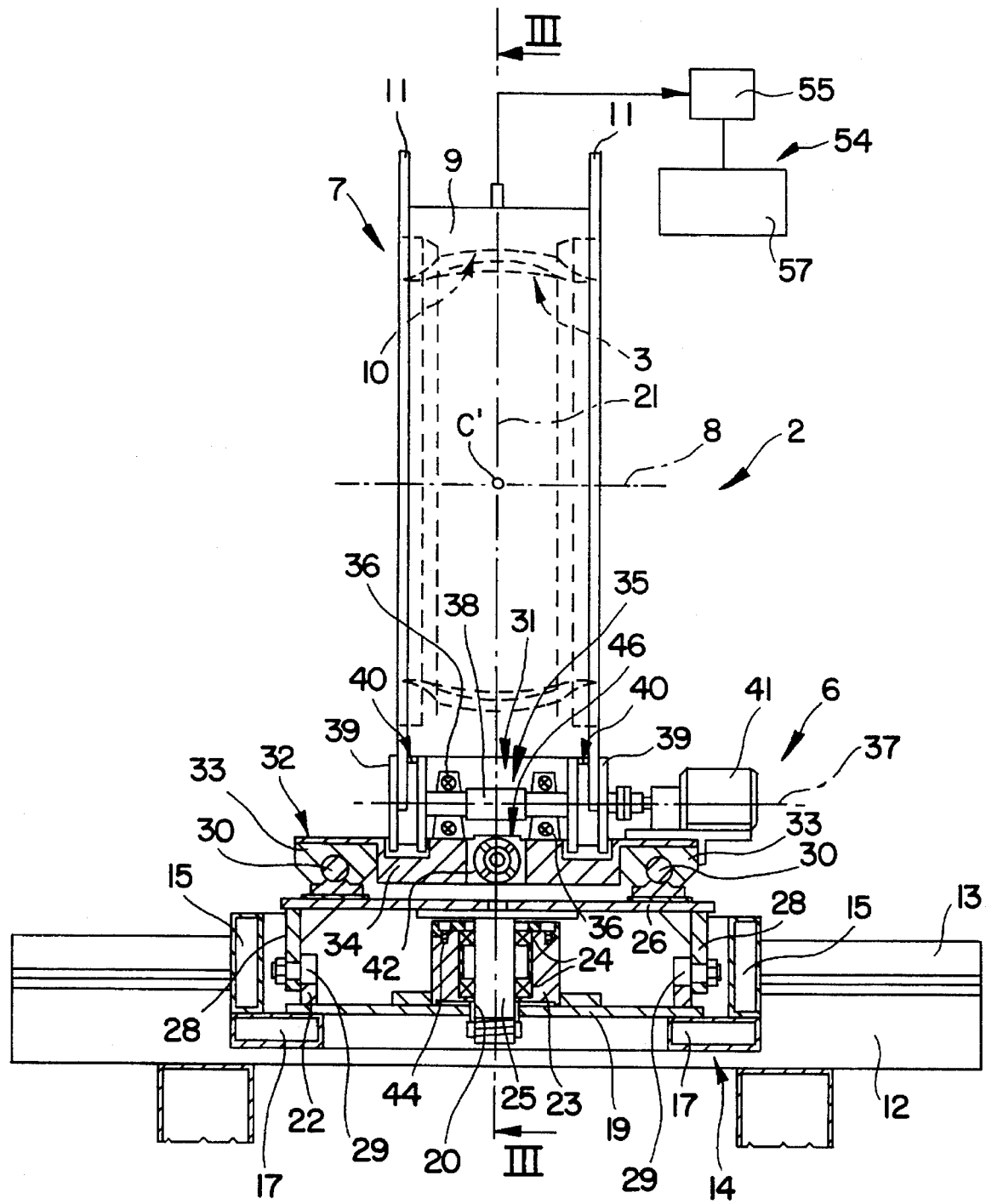
FIG. 2 shows a section of a detail in FIG. 1 along line II—II in FIG. 3.
Figure 3:
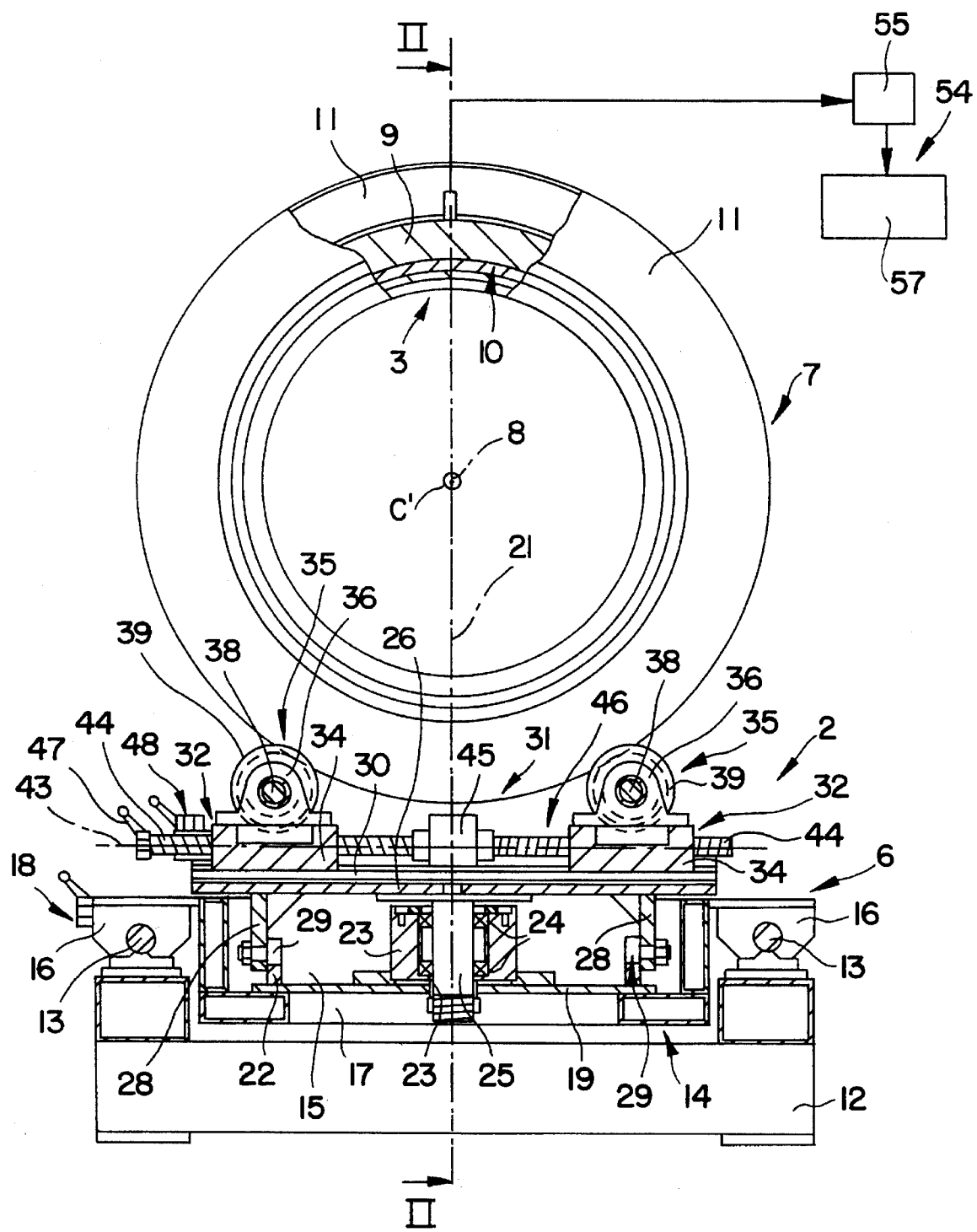
FIG. 3 shows a section along line III-III in FIG. 2.

As shown more clearly in FIGS. 2 and 3, carriage 6 comprises a base 14, in turn comprising two parallel cross members 15 perpendicular to rails 13, each presenting two end shoes 16 fitted in a sliding manner to rails 13, and a horizontal platform 17 between shoes 16 and facing the other cross member 15. Base 14 also comprises a lock device 18 for fixing base 14 to rails 13 in any given position; and a horizontal plate 19 having opposite peripheral portions resting on and connected integral with platforms 17. This presents a central hole 20 with a vertical axis 21, and an upper annular rib 22 extending about hole 20 and coaxial with axis 21. Upwards from plate 19, there extends a tubular body 23 connected integral with plate 19, coaxial with axis 21 and hole 20, and which is engaged, together with hole 20 and via the interposition of radial bearings 24, by a pin 25 extending downwards from a substantially rectangular platform 26. From the bottom surface of platform 26, there extend downwards four brackets 28 equally spaced about axis 21, each supporting a roller 29 running along an annular track coaxial with axis 21 and defined by the annular top end surface of rib 22.

The top surface of platform 26 is fitted integral with two substantially horizontal rails 30 symmetrical in relation to axis 21, and supporting in a sliding manner a saddle 31, in turn supporting toroidal body 7. Saddle 31 comprises two parallel cross members 32 perpendicular to rails 30, each presenting two end shoes 33 connected in a sliding manner to rails 30, and a horizontal platform 34 between shoes 33. The top surface of each platform 34 is fitted integral with a roller support 35 comprising two supports 36 aligned along a respective axis 37 parallel to respective cross member 32. Via the interposition of respective bearings, supports 36 support for rotation a shaft 38, the opposite ends of which project outwards of supports 36 fitted with respective rollers 39, each coaxial with respective axis 37 and having a groove 40. One of the shafts 38 is connected to the output of a motor 41 supported on a respective shoe 33. As shown in FIG. 2, the length of shaft 38 is such that the distance between grooves 40 on rollers 39 of each roller support 35, equals that between the two flanges 11.

As shown in FIGS. 2 and 3, cross members 32 are fitted through with respective nut screws 42 coaxial with each other along an axis 43 extending transversely to axes 37, and are engaged by respective oppositely threaded screws 44 connected at one end by a central block 45. Nut screws 42 and screws 44 constitute a device 46 for adjusting the width of saddle 31 within a given range. This presents an external control handle 47 fitted to one of the screws 44, and a releasable lock device 48 for preventing rotation of screws 44.

As shown in FIGS. 2 and 3, toroidal body 7 is placed on saddle 31 with each flange 11 engaged inside the grooves 40 of two rollers 39, so that it can be moved along its own axis 8 by moving carriage 6 along rails 13; rotated about axis 8 by means of motor 41; adjusted manually about axis 21 (or by means of a known motor, not shown, connected to pin 25); and moved, by means of device 46, transversely in relation to axis 8 and in the direction of axis 21.

With reference to FIG. 1, device 4 for forming first stage assembly 5 is a known device comprising a powered central shaft 49 rotating about its axis 49a, and from which project outwards two rings (only one shown) of spokes 50 supporting respective bead portions 51 of assembly 5. An annular element 52 supports the intermediate portion of assembly 5 coaxial with shaft 49, and in turn comprises a number of segments 53, each supported in a known manner by a respective actuator (not shown) for moving between the extracted position shown in FIG. 1, and a withdrawn position closer to shaft 49.

In addition to devices 2 and 4, station 1 is also defined by a control circuit 54 comprising a first known measuring device 55 for detecting both the unbalance vector of toroidal body 7 and the unbalance vector of the assembly consisting of toroidal body 7 and second stage assembly 3 mating with body 7, and which emits a signal indicating the vector of assembly 3 only. A second known measuring device 56 for detecting both the unbalance vector of device 4 and the unbalance vector of the assembly consists of device 4 and first stage assembly 5 fitted to device 4, which emits a signal indicating the vector of assembly 5 only. A control system 57 receives the output signals of measuring devices 55 and 56, and controls motor 41 as to rotate toroidal body 7 and position assembly 3, in relation to assembly 5, in such an angular assembly position as to minimize the resultant unbalance vector of the assembly consisting of the two mating assemblies 3 and 5.

In actual use, prior to forming assemblies 3 and 5, device 4 and motor 41 are activated for rotating annular element 52 and toroidal body 7 about respective axes 49a and 8, for detecting, by means of devices 55 and 56, the respective unbalance vectors, the positions, absolute values and directions of which, are memorized by control system 57.

Following formation of first stage assembly 5 on the one hand, and second stage assembly 3 on the other, device 4 and motor 41 are again activated, and devices 55 and 56 again employed for determining the unbalance vectors of annular element 52 and assembly 5 on the one hand, and toroidal body 7 and assembly 3 on the other. These further vectors are respectively compared by control system 57 with the individual vector values of annular element 52 and toroidal body 7 to determine the vectors of assemblies 5 and 3. Control system 57 then composes the latter two vectors to determine the relative angular position of assemblies 3 and 5 corresponding to a minimum resultant vector, and activates motor 41 to set assemblies 3 and 5 to said position.

At this point, platform 26 of carriage 6, the rails 13 of which are parallel to axis 49a, is rotated by an angle close to 45° so as to set axis 8 to the same angle in relation to axis 49a; and carriage 6 is moved along rails 13 until the center C of assembly 5 coincides with center C' of toroidal body 7 (corresponding to the intersection of axes 8 and 21). At the same time, for enabling partial insertion of assembly 5 inside assembly 3 (FIG. 1), a number of the top and bottom segments 53 about annular element 52 are withdrawn slightly. On achieving the configuration shown in FIG. 1, the withdrawn segments 53 are restored to the fully extracted position, and platform 26 restored to its original position so that axis 8 coincides with axis 49a.

Clearly, therefore, station 1 provides not only for producing tires (not shown) with a minimum unbalance vector, but also, by virtue of carriage 6, enables trouble free assembly of assembly 5 inside assembly 3 in much the same way as for a ball bearing.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A vectorial assembly method for first and second stage assemblies of road vehicle tires, the method comprising the steps of placing the first stage assembly about a first support rotatable about a first axis; placing the second stage assembly inside a second support comprising a toroidal body rotatable about a second axis coaxial with the second stage assembly; rotating the first and second stage assemblies about their respective axes, for detecting the respective imbalanced vectors; positioning the assemblies such that the resulting imbalanced vector is minimized; inserting the first stage assembly inside the second stage assembly after arranging the two assemblies in such relative angular positions as to form a tire having said minimized resultant imbalanced vector; and mating the two assemblies.

2. A method as claimed in claim 1, in which the unbalance vector of each said assembly is determined by rotating the respective support alone about the respective axis for determining the unbalance vector of the support; rotating said support together with the respective assembly for determining the unbalance vector of the support in combination with the respective assembly; and determining the unbalance vector of the assembly as a function of the difference between said two previously determined vectors.

3. A vectorial assembly method for first and second stage assemblies of road vehicle tires, the method comprising the steps of placing the first stage assembly about a first support rotatable about a first axis; placing the second stage assembly inside a second support comprising a toroidal body rotatable about a second axis coaxial with the second stage assembly; rotating the first and second stage assemblies about their respective axes, for detecting the respective imbalanced vectors; rotating at least one of the first stage assembly and second stage assembly about a third axis such that the first axis of the first support and the second axis of the second support are angled relative to one another; inserting the first stage assembly inside the second stage assembly after arranging the two assemblies in such relative angular positions as to minimize the resultant imbalanced vector of the assembled tire; maintaining the angle between the axes of the first support and the second support while moving the supports, so angled, in relation to each other so that the center of one of the supports coincides with the center of the other of the supports; rotating at least one of the supports in relation to the other about the third axis until the axis of the first stage assembly and the axis of the second stage assembly are parallel; and mating the two assemblies.

4. A method as claimed in claim 3 in which said angle between the axis of the first stage assembly and the second stage assembly is substantially equal to 45° when the supports are moved relative to one another.

5. A method as claimed in claim 3 in which the third axis is perpendicular to the axis of the first stage assembly and the axis of the second stage assembly.

* * * * *